United States Patent
Cohen et al.

(10) Patent No.: US 9,832,583 B2
(45) Date of Patent: Nov. 28, 2017

(54) ENHANCEMENT OF AUDIO CAPTURED BY MULTIPLE MICROPHONES AT UNSPECIFIED POSITIONS

(71) Applicant: Avaya Inc., Basking Ridge, NJ (US)

(72) Inventors: Azaria Cohen, Levona (IL); Tamar Barzuza, Tel Aviv (IL)

(73) Assignee: Avaya Inc., Basking Ridge, NJ (US)

( * ) Notice: Subject to any disclaimer, the term of this patent is extended or adjusted under 35 U.S.C. 154(b) by 71 days.

(21) Appl. No.: 14/936,855

(22) Filed: Nov. 10, 2015

(65) Prior Publication Data

US 2017/0133036 A1  May 11, 2017

(51) Int. Cl.
| | |
|---|---|
| *H04R 3/00* | (2006.01) |
| *H04R 5/02* | (2006.01) |
| *H04R 29/00* | (2006.01) |
| *G06T 7/00* | (2017.01) |
| *H04M 3/56* | (2006.01) |
| *H04N 7/15* | (2006.01) |
| *H04R 5/027* | (2006.01) |
| *H04R 27/00* | (2006.01) |

(52) U.S. Cl.
CPC ......... *H04R 29/005* (2013.01); *G06T 7/0042* (2013.01); *H04M 3/56* (2013.01); *H04N 7/15* (2013.01); *H04R 3/005* (2013.01); *G06T 2200/04* (2013.01); *H04R 5/027* (2013.01); *H04R 27/00* (2013.01); *H04R 2430/20* (2013.01)

(58) Field of Classification Search
CPC ............ G10L 21/0364; G10L 21/0356; G06T 7/0042; G06T 2200/04; H04R 3/005; H04R 29/005; H04R 2430/20

USPC ......... 381/1, 2, 17–23, 26, 58, 92, 306, 309, 381/310, 313; 382/103, 106
See application file for complete search history.

(56) References Cited

U.S. PATENT DOCUMENTS

| | | | |
|---|---|---|---|
| 2008/0285772 A1* | 11/2008 | Haulick | G01S 7/52003 381/92 |
| 2010/0039497 A1* | 2/2010 | Cutler | H04N 7/142 348/14.08 |
| 2012/0120218 A1* | 5/2012 | Flaks | G10L 21/028 348/77 |
| 2015/0085063 A1* | 3/2015 | Fish | G06F 3/041 348/14.08 |

(Continued)

FOREIGN PATENT DOCUMENTS

JP  2012186551 A  *  9/2012

OTHER PUBLICATIONS

MSE, relative distance to rotated object, Apr. 2015.*

*Primary Examiner* — William A Jerez Lora (57) ABSTRACT

Embodiments disclosed herein provide systems, methods, and computer readable media for steering a camera and enhancing audio captured by microphones at unspecified positions. In a particular embodiment, a method provides receiving audio captured by the plurality of microphones at a location and receiving video captured of a scene that includes the plurality of microphones captured by a first camera at a first camera position. The method further provides identifying the plurality of microphones in the scene and determining physical positions of the plurality of microphones at the location relative to the first camera position. The method then provides adjusting the audio based on the physical positions of the plurality of microphones.

16 Claims, 6 Drawing Sheets

(56) References Cited

U.S. PATENT DOCUMENTS

2015/0104050 A1\* 4/2015 Harrison ................ G06T 7/004
381/303

\* cited by examiner

ENHANCEMENT OF AUDIO CAPTURED BY MULTIPLE MICROPHONES AT UNSPECIFIED POSITIONS

TECHNICAL FIELD

Aspects of the disclosure are related to audio captured by multiple microphones and, in particular, to processing audio captured by multiple microphones at unspecified positions.

TECHNICAL BACKGROUND

In some situations, multiple microphones are used to capture audio. For example, during a conference call where parties at one endpoint of the call are positioned throughout a conference room, multiple microphones may be placed around the conference room to ensure each of the parties is captured well enough to be heard on the call. Otherwise, while a single microphone may be able to capture audio sufficiently for those parties positioned nearest, that microphone may have trouble capturing audio from parties positioned further away. Even in other examples, such as a single user, multiple microphones may be beneficial in order to capture the user's audio when, for instance, the user turns their head from one direction to another.

OVERVIEW

Embodiments disclosed herein provide systems, methods, and computer readable media for steering a camera and enhancing audio captured by microphones at unspecified positions. In a particular embodiment, a method provides receiving audio captured by the plurality of microphones at a location and receiving video captured of a scene that includes the plurality of microphones captured by a first camera at a first camera position. The method further provides identifying the plurality of microphones in the scene and determining physical positions of the plurality of microphones at the location relative to the first camera position. The method then provides adjusting the audio based on the physical positions of the plurality of microphones.

In some embodiments, the method further provides identifying a speaker in the audio, determining a first physical position of the speaker based on the physical positions of the plurality of microphones, and adjusting a video camera to feature the first physical position.

In some embodiments, determining a first physical position of the speaker comprises determining a time difference between when each of the plurality of microphones captured a portion of the audio from the speaker.

In some embodiments, identifying the plurality of microphones comprises performing image recognition on the video to identify each microphone of the plurality of microphones.

In some embodiments, the plurality of microphones each include a visual feature that the image recognition is configured to detect.

In some embodiments, the visual feature has known dimensions and determining the physical positions of the plurality of microphones comprises calculating a distance from the first camera for each of the plurality of microphones based on movement of the visual feature and the known dimensions.

In some embodiments, the visual feature comprises a T shaped element and the movement comprises a spinning of the T shaped element.

In some embodiments, the first camera comprises a three dimensional (3D) camera, and determining the physical positions of the plurality of microphones comprises deriving the physical positions of the plurality of microphones from depth information provided by the 3D camera.

In some embodiments, the method provides determining second physical positions of the plurality of microphones at the location and adjusting the audio based on the second physical positions of the plurality of microphones.

In some embodiments, the method provides receiving second video captured of a second scene that includes the plurality of microphones captured by a second camera at a second camera position, identifying the plurality of microphones in the second scene, determining second physical positions of the plurality of microphones at the location relative to the second camera position, and adjusting the audio based on the second physical positions of the plurality of microphones.

In another embodiment, an audio management system is provided that includes a communication interface and a processing system. The communication interface is configured to receive audio captured by the plurality of microphones at a location and receive video captured of a scene that includes the plurality of microphones captured by a first camera at a first camera position. The processing system is configured to identify the plurality of microphones in the scene, determine physical positions of the plurality of microphones at the location relative to the first camera position, and adjust the audio based on the physical positions of the plurality of microphones.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

An array of multiple microphones may allow for calculations that enhance the audio captured by the microphones in the array. In particular, while some audio enhancement techniques do not require known microphone positions, other enhancement techniques rely on knowing positions of microphones relative to one another and, in some cases, the positions of the microphones in a space. For example, microphone positions are needed for delay-sum beam forming and assist when choosing a best microphone or microphone cluster for audio, among other enhancements that may benefit from knowledge of microphone positions. When enhancement calculations require the positions of the microphones to be known by having been previously specified to the calculating system (e.g. by user, installer, or manufacturer of the system), if the microphones were to be moved, then the calculations will likely not achieve the intended audio enhancement result. Consequently, microphone arrays that are used along with such calculations are affixed to certain positions (at least relative to one another if not within space) so that the calculations may achieve the intended result. In contrast, embodiments described below do not require the positions of the microphones to be specified to the system ahead of the calculations. Rather, the positions of the microphones are determined from video captured of the microphones.

Figure 1:
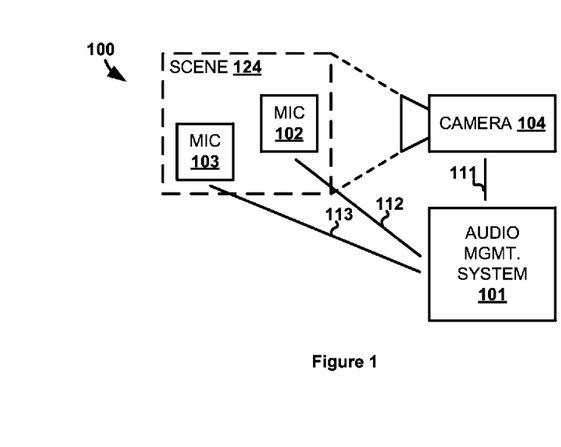
FIG. 1 illustrates an audio capture environment for enhancing audio from microphones at unspecified locations.

FIG. 1 illustrates audio capture environment 100 for enhancing audio captured by multiple microphones at unspecified positions. Audio capture environment 100 includes audio management system 101, microphone 102, microphone 103, and camera 104. Audio management system 101 and camera 104 communicate over communication link 111. Audio management system 101 and microphone 102 communicate over communication link 112. Audio management system 101 and microphone 103 communicate over communication link 113.

Audio management system 101 received audio captured by microphones 102 and 103. The captured audio may be recorded, used for a communication, played back over speakers, or for some other audio purpose—including combinations thereof. In some examples, audio management system 101 is incorporated into another system that handles the audio for one of the purposes described above. For instance, audio management system 101 may be included in a conferencing system that facilitates remote voice and/or videoconferences between parties at remote locations. Regardless of the purpose for the captured audio, audio management system 101 enhances the audio using calculations dependent upon knowing the positions of microphones 102 and 103.

Figure 2:
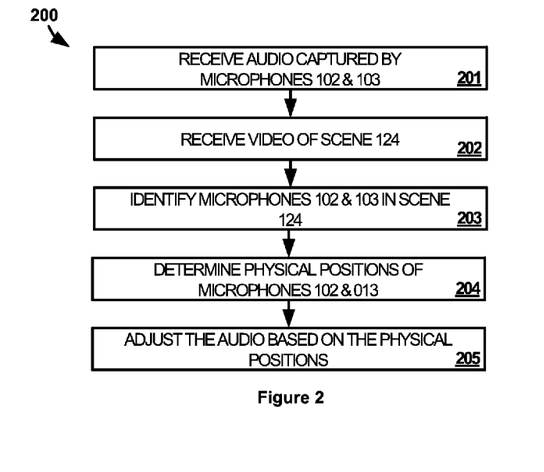
FIG. 2 illustrates a method of operating the audio capture environment to enhance audio from microphones at unspecified locations.

FIG. 2 illustrates a method 200 for operating audio capture environment 100 to enhance audio from microphones at unspecified locations. Method 200 provides, receiving audio captured by microphones 102 and 103 at a location (201). While only two microphones are present in audio capture environment 100, any number of additional microphones may also be used to captured the audio. The captured audio may be audio received for a communication, audio received before a communication, audio received for microphone or system testing, or audio received for some other purpose. Method 200 further provides receiving video captured of scene 124 that includes microphones 102 and 103 captured by camera 104 at a first camera position (202). Scene 124 may be indoors or outdoors and may comprise any possible physical area that can be captured by a camera image sensor. Microphones 102 and 103 must be visible in scene 124 such that microphones 102 and 103 can be identified within scene 124.

Accordingly, method 200 further provides audio management system 101 identifying microphones 102 and 103 in scene 124 (203). Any type of image processing mechanism capable of identifying objects in captured video may be used. In some cases, microphones 102 and 103 may be identified based on their shape alone, although, in other cases microphones 102 and 103 may include distinguishing features that make microphones 102 and 103 easier to identify during image processing. For example, microphones 102 and 103 may include a physical feature that's primary purpose is to allow for easier image processing identification. In one particular example, the feature may be a light that turns on at least when video is being captured to identify microphones 102 and 103 in scene 124. The light may blink in a particular pattern, may display a particular color, or perform some other light action that, when known by audio management system 101, allows for audio management system 101 to identify microphones 102 and 103 in scene 124—including combinations thereof.

After identifying microphones 102 and 103, method 200 provides audio management system 101 determining physical positions microphones 102 and 103 at the location relative to the first camera position (204). That is, method step 203 determines how far from camera 104 each of microphones 102 and 103 are positioned as well as where to the left or right and up or down from camera 104 each of microphones 102 and 103 are positioned. That is, camera 104 (or, more specifically, the focal point of camera 104) is the origin of a three dimensional x, y, z coordinate system. In some cases, the orientations of microphones 102 and 103 may be determined as well, which may be important if microphones 102 and 103 are not omnidirectional microphones. Determining the positions of microphones 102 and 103 relative to camera 104 also allows audio management system 101 to calculate the positions of microphones 102 and 103 relative to one another.

The positions of microphones relative to one another are what allows audio enhancement algorithms to perform audio enhancement. Therefore, method 200 further provides audio management system 101 adjusting the audio based on the physical positions microphones 102 and 103 (205). For example, audio management system 101 may adjust the audio so that the voice of a speaker more pronounced relative to other sound (e.g. background noise). Other ways in which audio can be adjusted with knowledge of microphone positioning may also be used. Regardless of the way in which the audio is enhanced, audio management system 101, using an image captured by camera 104, is able to determine the positions of microphones 102 and 103 on its own. After adjustment, the audio may be stored, played back immediately, transferred to another system, transferred as an audio media stream or as an audio component of a video media stream, or used for some other purpose—including combinations thereof.

The microphone position determination capability described above has the added benefit of allowing microphones 102 and 103 to be moved to different locations at almost any time in some embodiments. Audio management system 101 simply repeats steps 202-204 and enhances audio based on the newly determined positions of microphones 102 and 103. In some cases, audio management system 101 itself monitors the positions of microphones 102 and 103 in scene 124 as camera 104 continues to capture video in order to automatically detect movement of microphones 102 and 103. In alternative scenarios, input may be required instructing audio management system 101 to repeat steps 202-204. For example, as user may reposition one or more of microphones 102 and 103 and then press a button that indicates for audio management system 101 to re-determine the positions of microphones 102 and 103.

In some embodiments, one or more additional cameras may be employed in an arrangement similar to camera 104 and microphones 102 and 103. The one or more additional cameras may be used to capture microphones that are not captured by camera 104, as may be the case if something is obscuring the microphones to camera 104. Likewise, the one or more additional cameras may be used to confirm the physical position of a microphone should that microphone be captured by more than one camera. In some cases, the position of the other camera relative to camera 104 may be known to audio management system 104 while in other cases the other camera may be captured in scene 124 and its position determined in the same manner as microphones 102 and 103.

Referring back to FIG. 1, audio management system 101 comprises a computer processor system and an interface for communicating microphones 102, 103 and camera 104. In some cases, the interface may be internal to audio management system 101 (e.g. a system bus) if one or more of microphones 102, 103, and camera 104 are incorporated into audio management system 101. Audio management system 101 may also include other components such as a router, server, data storage system, user interface, and power supply. Audio management system 101 may reside in a single device or may be distributed across multiple devices. Audio management system 101 may be a communication server, conferencing system, application server, personal computer workstation, smartphone, tablet, or some other computing system—including combinations thereof.

Microphones 102 and 103 each comprise at least one audio pick-up microphone element. Microphones 102 and 103 may each further include a housing, power supply, user interface, storage system, network interface, or some other type of audio capture or processing component. In some cases, microphones 102 and 103 may transfer an analog audio signal to audio management system 101. In other cases, microphones 102 and 103 may digitize the captured signal and transfer the digitized signal to audio management system 101 over a network or via a direct link.

Camera 104 comprises a lens, a digital image sensor, and an interface for communicating with audio management system 101. Camera 104 may further include a power supply, user interface, storage system, motor(s) for panning, tilting, and/or zooming, or some other component for operating a camera. Camera 104 may be a three dimensional (3D) camera, two dimensional camera (2D), plenoptic camera, or some other type of camera.

Communication links 111-113 use metal, glass, air, space, or some other material as the transport media. One or more of communication links 111-113 could be an internal link, such as a system bus, if audio management system 101 and any of camera 104 or microphones 102-103 are part of a single device. Communication links 111-113 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-113 could be direct links or may include intermediate networks, systems, or devices.

Figure 3:
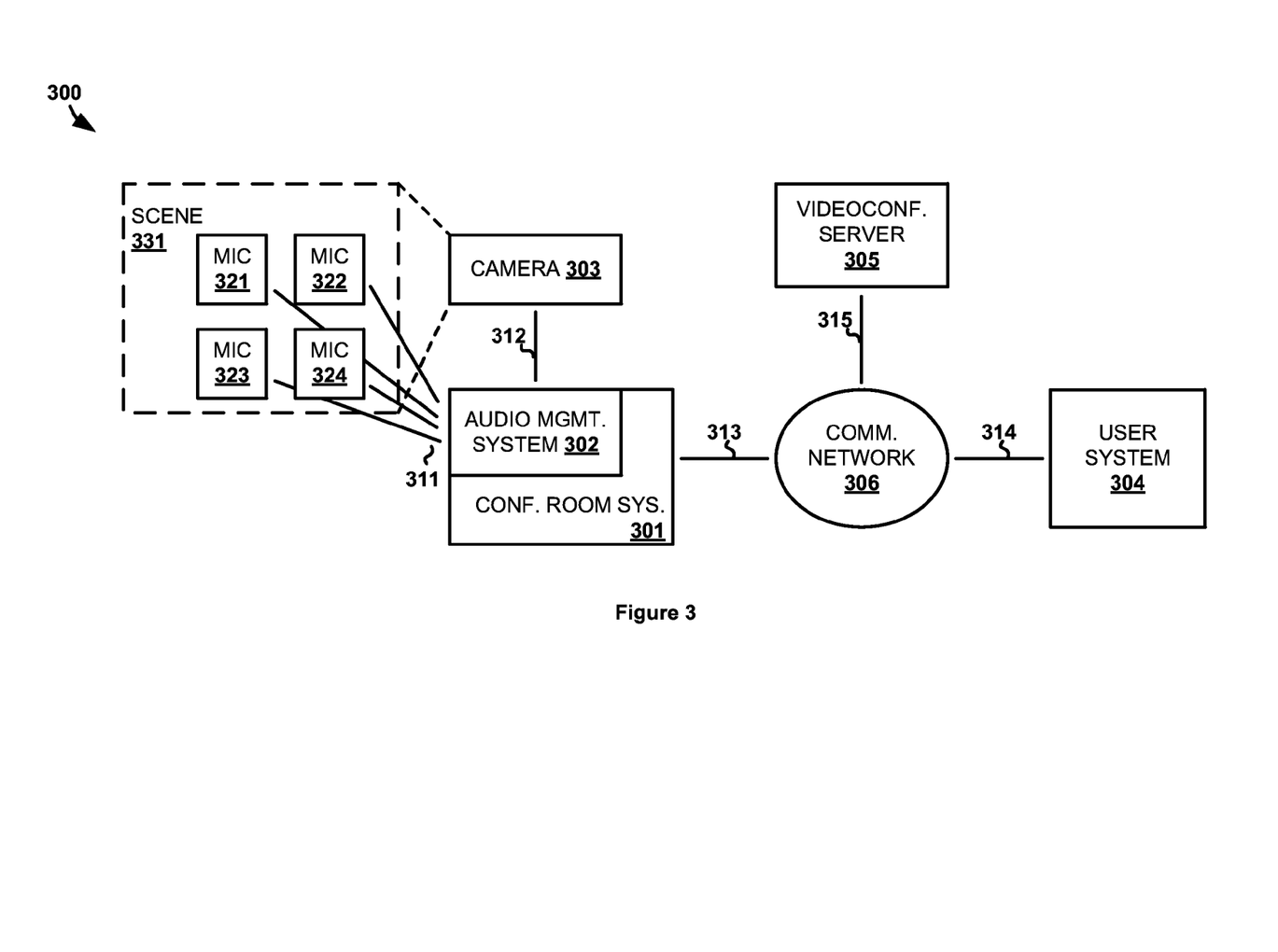
FIG. 3 illustrates another audio capture environment for enhancing audio from microphones at unspecified locations.

FIG. 3 illustrates video communication environment 300 for enhancing audio captured by multiple microphones at unspecified positions. Video communication environment 300 includes conference room system 301, camera 303, microphones 321-324, user system 304, videoconference server 305, and communication network 306. Conference room system 301 includes audio management system 302. Camera 303 and conference room system 301 communicate over communication link 312. Conference room system 301 and communication network 306 communicate over communication link 313. User system 304 and communication network 306 communicate over communication link 314. Videoconference server 303 and communication network 306 communicate over communication link 315.

Communication network 306 comprises network elements that provide communications services. Communication network 306 may comprise switches, wireless access nodes, Internet routers, network gateways, application servers, computer systems, communication links, or some other type of communication equipment—including combinations thereof. Communication network 306 may be a single network (e.g. local area network, wide area network, the Internet, etc.) or may be a collection of networks.

Videoconference server 305 is a system that facilitates the exchange of real-time video communications between conference room system 301 and user system 304. The video communications may be unidirectional from conference room system 301 to user system 304 or may be bidirectional should user system 304 be equipped with a camera or other component necessary for video communications. While only two end systems 301 and 304 are shown in video communication environment 300, any number of systems could participate in a video communication depending on the capacity of videoconference server 305. It should be understood that some embodiments may remove the need for videoconference server 305 altogether, as may be the case in a peer-to-peer video communication.

Conference room system 301 is a system for real-time video communications that is set up in a conference room type of situation. However, in other examples, conference room system 301 may be some other type of system that captures audio via multiple microphones. Likewise, user system 304 may also be a conference room system and may enhance audio in the same way as conference room system 301 does, as described below. However, for the purposes of this example, user system 304 merely comprises a system having a camera, microphone, and a speaker to allow a user to exchange communications with users of conference room system 301.

Figure 4:
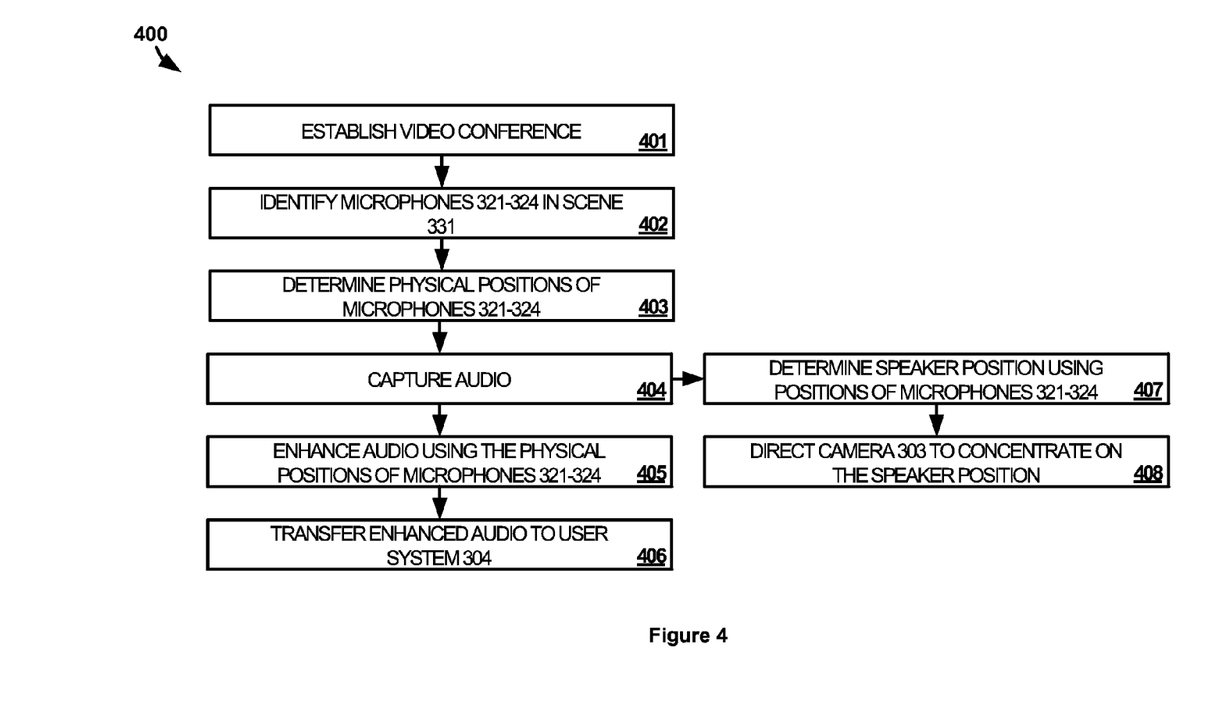
FIG. 4 illustrates a method of operating the other audio capture environment to enhance audio from microphones at unspecified locations.

FIG. 4 illustrates a method 400 for operating video communication environment 300 to enhance audio from microphones at unspecified locations. Method 400 provides that a videoconference is established between conferencing room system 301 and user system 304 (401). This example, videoconference server 305 facilitates the videoconference between conference room system 301 and user system 304. The media (e.g. audio/video) for the video conferencing may pass through videoconference server 305 or videoconference server 305 may simply handle be set up signaling for the Videoconference. The videoconference may be established by either conference room system 301 or user system 304.

When camera 303 begins capturing video of scene 331 for the videoconference, which may occur before or after the videoconference has been established, audio management system 302 identifies microphones 321-324 in scene 331 (402). Scene 331 may include one or more users in the conference room where conference room system 301 is located. Regardless of what users are shown in seeing 331, microphones 321-324 must be shown in scene 331 in order for their positions to be determined by audio management system 302. Any type of image processing (i.e. object identification) may be performed on the video image captured by camera 303 of scene 331 in order to determine where microphones 321-324 are located in scene 331.

Once microphones 321-324 are identified in scene 331, audio management system 302 determines the physical positions of microphones 321-324 relative to camera 303 (403). If camera 303 is a 3D camera, then the distance of microphones 321-324 from camera 303 can be calculated from the perspective differential in camera 303's stereoscopic image. Additionally, camera 303 can provide its pan, tilt, and zoom settings for calculating left/right and up/down distances for each of microphones 321-324. If camera 303 is a 2D camera, then the positions of microphones 321-324 may be calculated in some other way. For instance, as described in a specific example below, objects having know measurements may be placed for capture in scene 331. Those known measurements can be used to convert distances in the captured image to corresponding distances in the room being captured (e.g. 30 pixels in the image corresponds to 1 foot in the room).

Audio is captured by microphones 321-324 and transferred to audio management system 302 (step 404). The audio may be captured beginning before the videoconference is even established or may begin being captured after the videoconference has been established. For example, conference room system 301 may begin capturing audio and/or video before the videoconference has begun for setup purposes, to determine the positions of microphones 321-324 ahead of the videoconference, to show participants how they will look and sound on the videoconference, or for some other reason.

Since audio management system 302 knows the positions of microphones 321-324 from the determination at step 403, audio management system 302 then uses those known positions in calculations to enhance the captured audio (405). The algorithm used to enhance the audio may be any algorithm that bases its enhancement calculations on knowing the positions of microphones capturing the audio. The audio enhancement algorithm acts on the audio in real-time since the audio is part of the real-time videoconference between conference room system 301 and user system 304. Audio management system 302 may also use audio enhancement techniques that do not rely on knowledge of microphone positions.

As the audio finishes processing, the enhanced audio is transferred to user system 304 (406). The enhanced audio may be transferred to user system 304 in a separate media stream from a corresponding video stream or may be transferred to user system 304 as the audio track of the corresponding video stream. The video and audio received at user system 304 is presented to a user(s) at user system 304 so that the user at user system 304 can see and hear the users being captured at conference room system 301 in substantially real-time.

In some embodiments, in addition, or in alternative, to enhancing the audio, audio management system 302 determines a speaker position using the determined positions of microphones 321-324 (407). The speaker position may be determined using any algorithm for determining sound origin based on knowing the positions of microphones capturing the speaker. In general, the position of the speaker may be estimated based on the loudness of the speaker's voice as captured by each of microphones 321-324 and/or based on the time difference between when each of microphones 321-324 capture audio (e.g. a microphone closer to the speaker will receive sound waves before a microphone farther away). An example estimator for finding the time different between two captured audio signals is the cross-correlation method and its variants, mainly the generalized cross correlation (GCC) with phase transform (PHAT) normalization. Once the speaker's position is determined, audio management system 302 directs camera 303 to feature the speakers position in video transferred to user system 304 (408). Camera 303 may be directed to pan, tilt, or zoom (digitally or optically) to feature the speakers position in the video image transferred to user system 304. Should the processing of the audio determine that the speaker's position has changed (e.g. the same speaker moved or a new speaker is talking), then audio management system 302 directs camera 303 to feature the changed position in the video.

If microphones 321-324 are no longer all in scene 331 when featuring the speaker, then camera 303 will need to adjust scene 331 to include microphones 321-324 should new positions need to be determined for microphones 321-324. In some cases, camera 303 may be used for determining the positions of microphones 321-324 while another camera(s) is used to capture video for transfer to user system 304 as part of the videoconference. The position of that other camera relative to microphones 321-324 or camera 303 will also need to be determined so that the determined speaker position can translated to movement of that other camera. Determining the position of the other camera may be performed in the same manner as determining the positions of microphones 321-324. In some examples, the other camera may be in a substantially similar position near camera 303 so that the position of camera 303 can also be considered the position of the other camera.

It should be understood that, while the positions of microphones 321-324 are determined for audio enhancement and speaker localization in the example above, the positions of microphones 321-324 may be used for other purposes. That is, in some examples, other uses that require the positions of microphones 321-324 to be known may use audio management system 302 to determine those positions, as described in relation to steps 402 and 403.

Figure 5:
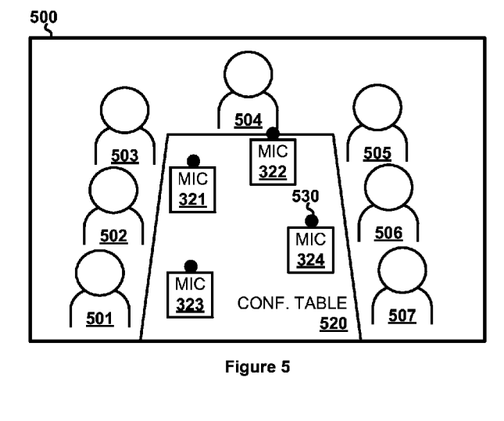
FIG. 5 illustrates a video image in an operational scenario.

FIG. 5 illustrates a video image 500 in an example scenario of video communication environment 300 to feature a speaker position. Video image 500 in this example is captured by camera 303 and represents an example of scene 331. Shown in video image 500 are microphones 321-324, participants 501-507, and conference table 520. Participants 501-507 are all seated around conference table 520 and microphones 321-324 are placed on conference table 520. Audio management system 302 processes image 500 to identify microphones 321-324 and determine their position in the physical location captured in image 500, as described in more detail above.

In this example, each of microphones 321-324 has a LED light 530. LED 530 is used to help audio management system 302 identify microphones 321-324 in image 500. That is, LED 530 may emit a particular light color or light pattern (e.g. blinking on and off or changing colors) that the image processing algorithm may detect in order to more easily identify microphones 321-324 in image 500. In some cases, each microphone may emit a different color or pattern, either concurrently or in sequence, so that the image processing can more easily differentiate which of microphones 321-324 is which when identifying microphones 321-324 in image 500. For example, audio management system 302 may transfer an instruction to each of microphones 321-324 indicating how each Led 530 should emit light for identification.

Figure 6:
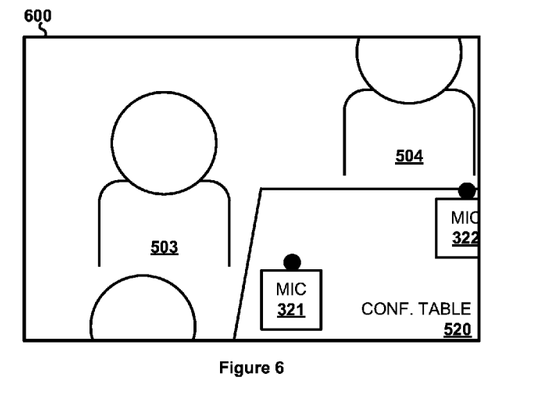
FIG. 6 illustrates another video image in an operational scenario.

Once each of microphones 321-324 have been identified in image 500 and the positions of microphones 321-324 have been determined, audio management system 302 performs speaker localization for participants 501-507 during the videoconference. Speaker localization based on captured audio and the determined positions of microphones 321-324 may be used on its own or may be used to assist additional video processing of video image 500 when determining a speaker's position. Hence, knowing the positions of microphones 321-324 allows for speaker localization, or localization of any audio source, without requiring the source to also be captured in image 500 (even though in this example the speaker happens to be captured) or anything else to be previously known about the source's position. In this example, participant 503 speaks and audio management system 302 processes the received audio to determine that the speech is closest to microphone 321 and closer to microphone 322 than to microphone 323. As such, audio management system 302 instructs camera to feature an area of image 500 that is nearby microphone 321. FIG. 6 illustrates video image 600, which is a video image captured subsequently to video image 500 and features the position from where speech is determined to have originated. Specifically, participant 503 is now featured more prominently in image 600. This allows a user at user system 304 to better view participant 503 when participant 503 is speaking. Should another participant begin speaking, then audio management system 302 will perform speaker localization again and that participant will be featured instead of participant 503 in a similar manner.

Figure 7:
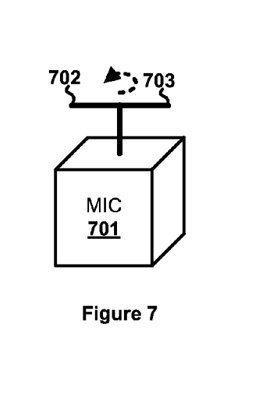
FIG. 7 illustrates a microphone in an operational scenario.

FIG. 7 illustrates microphone 701 in an example scenario for determining microphone position. Microphone 701 may be an example of each of microphones 321-324 in embodiments where camera 303 is a 2D camera (or an example of each of microphones 102 and 103 in embodiments where camera 104 is a 2D camera). Microphone 701 includes a T shaped element affixed to the top of microphone 701. The T shaped element comprises arms 702 and 703, which are of equal and known lengths (from the center trunk) to audio management system 302. Knowledge of the lengths of arms 702 and 703 allows audio management system 302 to determine a distance from camera 303 as arms 702 and 703 spin on their trunk.

Figure 8:
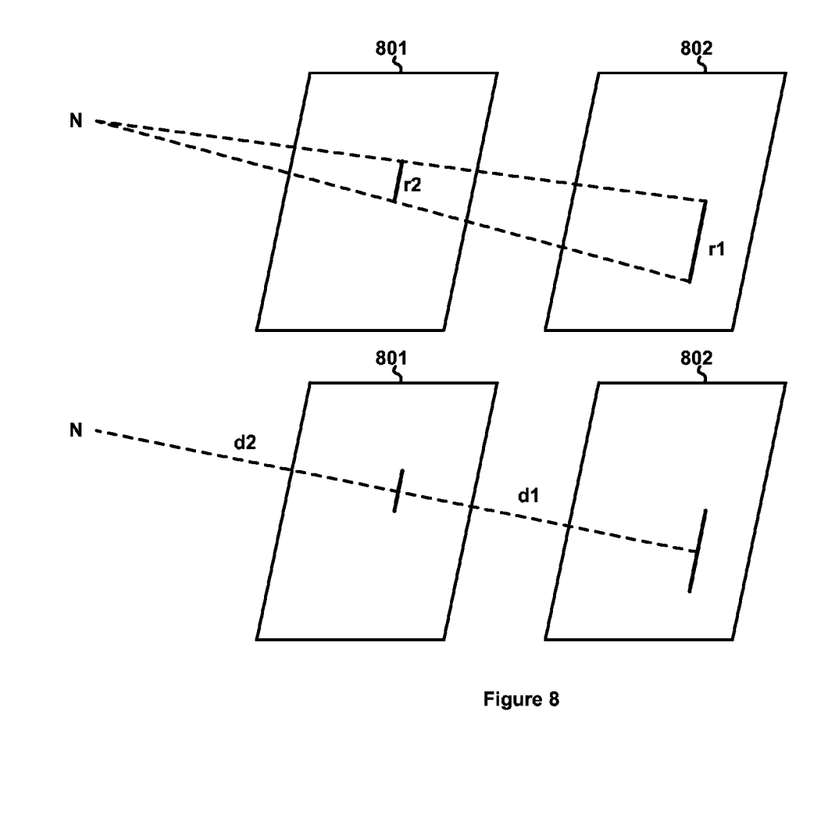
FIG. 8 illustrates an image plane and a physical plane in an operational scenario.

FIG. 8 illustrates image plane 801 and corresponding physical plane 802 in an example scenario of determining the position of microphone 701. Image processing is used to identify microphone 701 and arms 702 and 703. As arms 702 and 703 spin, further image processing by audio management system 302 determines when arms 702 and 703 are in a position that is parallel to image plane 801. Specifically, when arms 702 and 703 are of the same length in the image plane, then arms 702 and 703 are parallel to image plane 801.

As noted above, the actual physical lengths of arms 702 and 703 are known to audio management system 302. Thus, audio management system 302 determines the ratio, R, of the combined length of arms 702 and 703 in the physical plane 802 where arms 702 and 703 reside, r1, to the combined length of arms 702 and 703 in image plane 801, r2, to get R=r1/r2. The ratio R is also the ratio of the distances between the physical plane 802 and image plane 801, R=(d2+d1)/d2. Moreover, the distance from the focal point of camera 303, N, to image plane 801, d2, is known to audio management system 302 from the parameters of camera 303. Therefore, knowing R and d2, audio management system 302 is able to calculate d1 and the distance, z, from camera 303 to microphone 701, which equates to d1+d2.

Regardless of how the z distance for microphone 701 is determined (e.g. the method above, some other 2D distance method, a 3D camera, etc.), the x and y coordinates of microphone 701 along physical plane 802 relative the center of physical plane 802 can be calculated for microphone 701.

A single point perspective is given by:

$$[P_r] = \begin{bmatrix} 1 & 0 & 0 & 0 \\ 0 & 1 & 0 & 0 \\ 0 & 0 & 0 & -r \\ 0 & 0 & 0 & 1 \end{bmatrix}$$

The perspective matrix is singular but knowing the z-coordinate reveals its inverse as follows:

$$[x, y, z, 1][P_r] = [x, y, 0, 1 - rz] \rightarrow [x^*, y^*, 0, 1] = \left[\frac{x}{1-rz}, \frac{y}{1-rz}, 0, 1\right]$$

(x*, y*) in the above equation are image coordinates of microphone 701 relative to the image center of image plane 801 and r is the focal distance. The values for x* and y* are measurable from the pixel distance in light of pixel density, which is a camera parameter for camera 303. Substituting z in the above equations will yield the physical x and y coordinates along physical plane 802 for microphone 701.

Figure 9:
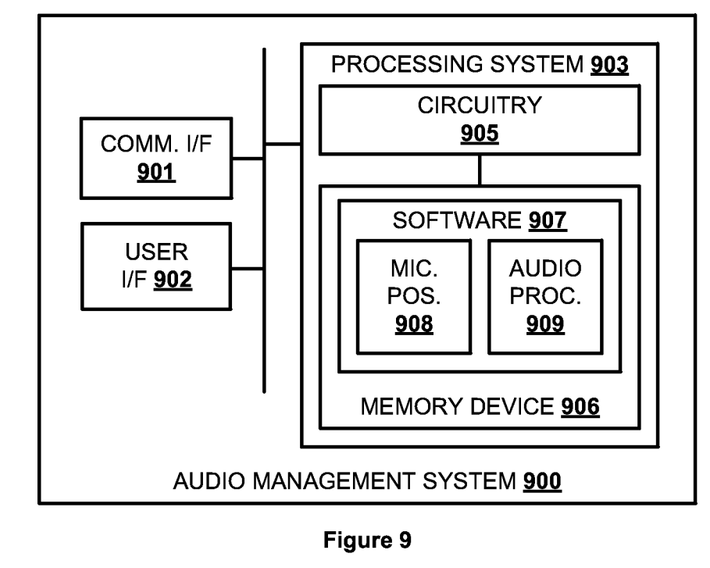
FIG. 9 illustrates an audio management system for enhancing audio from microphones at unspecified locations.

FIG. 9 illustrates audio management system 900. Audio management system 900 is an example of audio management systems 101 and 302, although systems 101 and 302 could use alternative configurations. Audio management system 900 comprises communication interface 901, user interface 902, and processing system 903. Processing system 903 is linked to communication interface 901 and user interface 902. Processing system 903 includes processing circuitry 905 and memory device 906 that stores operating software 907. Audio management system 900 may include other well-known components such as a battery and enclosure that are not shown for clarity. Audio management system 900 may be a personal computer, tablet, application server, conferencing system, private branch exchange, or some other computing apparatus—including combinations thereof.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user to receive user inputs and to present media and/or information. User interface 902 may include a speaker, microphone, camera, buttons, lights, display screen, touch screen, touch pad, scroll wheel, communication port, or some other user input/output apparatus—including combinations thereof. In some examples, user interface 902 includes a plenoptic camera. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Processing circuitry 905 is typically mounted on a circuit board that may also hold memory device 906 and portions of communication interface 901 and user interface 902. Operating software 907 comprises computer programs, firmware, or some other form of machine-readable processing instructions. Operating software 907 includes microphone position module 908 and audio processing module 909. Operating software 907 may further include an operating system, utilities, drivers, network interfaces, applications, or some other type of software. When executed by processing circuitry 905, operating software 907 directs processing system 903 to operate audio management system 900 as described herein.

In particular, audio processing module 909 directs processing system 903 to receive audio captured by the plurality of microphones at a location. Microphone position module 908 directs processing system 903 to receive video captured of a scene that includes the plurality of microphones captured by a first camera at a first camera position, identify the plurality of microphones in the scene, and determine physical positions of the plurality of microphones at the location relative to the first camera position. Audio processing module 909 further directs processing system 903 to adjust the audio based on the physical positions of the plurality of microphones.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of determining positions of a plurality of microphones, the method comprising:
   receiving audio captured by the plurality of microphones at a location;
   receiving video captured of a scene that includes the plurality of microphones captured by a first camera at a first camera position, wherein the plurality of microphones each include a visual feature with known dimensions;
   identifying the plurality of microphones in the scene using image recognition on the video to identify the visual feature of each microphone of the plurality of microphones;
   determining physical positions of the plurality of microphones at the location relative to the first camera position by, at least in part, calculating a distance from the first camera for each of the plurality of microphones based on movement of the visual feature and the known dimensions; and
   adjusting the audio based on the physical positions of the plurality of microphones.

2. The method of claim 1, further comprising:
   identifying a speaker in the audio;
   determining a first physical position of the speaker based on the physical positions of the plurality of microphones; and
   adjusting a video camera to feature the first physical position.

3. The method of claim 2, wherein determining a first physical position of the speaker comprises:
   determining a time difference between when each of the plurality of microphones captured a portion of the audio from the speaker.

4. The method of claim 1, wherein the movement comprises rotational movement.

5. The method of claim 4, wherein the visual feature comprises a T shaped element and the rotational movement comprises a spinning of the T shaped element.

6. The method of claim 1, wherein the first camera comprises a three dimensional (3D) camera, and wherein determining the physical positions of the plurality of microphones comprises:
   deriving the physical positions of the plurality of microphones from depth information provided by the 3D camera.

7. The method of claim 1, further comprising:
   determining second physical positions of the plurality of microphones at the location; and
   adjusting the audio based on the second physical positions of the plurality of microphones.

8. The method of claim 1 further comprising:
   receiving second video captured of a second scene that includes the plurality of microphones captured by a second camera at a second camera position;
   identifying the plurality of microphones in the second scene;
   determining second physical positions of the plurality of microphones at the location relative to the second camera position; and
   adjusting the audio based on the second physical positions of the plurality of microphones.

9. An audio management system for determining positions of a plurality of microphones, the audio management system comprising:
   a communication interface configured to receive audio captured by the plurality of microphones at a location and receive video captured of a scene that includes the plurality of microphones captured by a first camera at a first camera position, wherein the plurality of microphones each include a visual feature with known dimensions;
   a processing system configured to identify the plurality of microphones in the scene using image recognition on the video to identify the visual feature of each microphone of the plurality of microphones, determine physical positions of the plurality of microphones at the location relative to the first camera position by, at least in part, calculating a distance from the first camera for each of the plurality of microphones based on movement of the visual feature and the known dimensions, and adjust the audio based on the physical positions of the plurality of microphones.

10. The audio management system of claim 9, further comprising:
    the processing system configured to identify a speaker in the audio, determine a first physical position of the speaker based on the physical positions of the plurality of microphones, and adjust a video camera to feature the first physical position.

11. The audio management system of claim 10, wherein the processing system configured to determine a first physical position of the speaker comprises:

the processing system configured to determine a time difference between when each of the plurality of microphones captured a portion of the audio from the speaker.

12. The audio management system of claim 9, wherein the movement comprises rotational movement.

13. The audio management system of claim 12, wherein the visual feature comprises a T shaped element and the rotational movement comprises a spinning of the T shaped element.

14. The audio management system of claim 9, wherein the first camera comprises a three dimensional (3D) camera, and wherein the processing system configured to determine the physical positions of the plurality of microphones comprises:

the processing system configured to derive the physical positions of the plurality of microphones from depth information provided by the 3D camera.

15. The audio management system of claim 9, further comprising:

the processing system configured to determine second physical positions of the plurality of microphones at the location and adjust the audio based on the second physical positions of the plurality of microphones.

16. The audio management system of claim 9 further comprising:

receiving second video captured of a second scene that includes the plurality of microphones captured by a second camera at a second camera position;

identifying the plurality of microphones in the second scene;

determining second physical positions of the plurality of microphones at the location relative to the second camera position; and adjusting the audio based on the second physical positions of the plurality of microphones.

* * * * *